Patented July 24, 1951

2,562,152

UNITED STATES PATENT OFFICE 2,562,152

COMPOUND OF PENICILLIN AND COBALT AND PREPARATION THEREOF

Robert W. Shortridge, Terre Haute, Ind., assignor to Commercial Solvents Corporation, Terre Haute, Ind., a corporation of Maryland No Drawing. Application September 21, 1949, Serial No. 117,063

13 Claims. (Cl. 260—239.1)

My invention relates to a new and useful compound of penicillin containing cobalt. More particularly my invention relates to hexamminecobalt(III) benzylpenicillinate trihydrate, and to a process for preparing the same.

Hexamminecobalt(III) benzylpenicillinate trihydrate can, in general, be prepared by reacting an alkali or alkaline earth metal salt of benzylpenicillin and hexamminecobalt(III) chloride in the presence of water and either methylene chloride or chloroform.

The four substances which are necessary to produce my novel penicillin compound (an alkali or alkaline earth metal salt of benzylpenicillin, hexamminecobalt(III) chloride, water, and either methylene chloride or chloroform) can be introduced into the reaction vessel in any order. This is true because both methylene chloride and chloroform are only slightly soluble in water; and, consequently, being denser than water, these substances will form a separate layer below whatever quantity of water is present. Furthermore, neither the alkali nor alkaline earth metal salts of benzylpenicillin nor hexamminecobalt-(III) chloride are appreciably soluble in either methylene chloride or chloroform. Therefore, it can be seen that any method of adding the necessary reactants will produce the same result; namely, the alkali or alkaline earth metal salt of benzylpenicillin and the hexamminecobalt-(III) chloride will dissolve in the water, and in the presence of either methylene chloride or chloroform an orange-red material will be produced.

The orange-red material, referred to above, is apparently a complex of hexamminecobalt(III) benzylpenicillinate trihydrate with either methylene chloride or chloroform. My experimental investigations lead me to believe that this complex, as formed in the reaction vessel, is composed of two moles of either methylene chloride or chloroform per mole of hexamminecobalt(III) benzylpenicillinate trihydrate. I do not wish to limit myself to any particular ratio, however, since the complex which is apparently formed has been found to be very unstable, and readily decomposes on exposure to air to give hexamminecobalt(III) benzylpenicillinate trihydrate. Moreover, the orange-red material will be virtually certain to contain some excess methylene chloride or chloroform which is not molecularly associated. I have definitely established, however, that the orange-red material always appears if the reaction is performed in the presence of methylene chloride or chloroform whereas the colors do not appear if water is the only solvent present and that the orange-red material always contains substantial quantities of either methylene chloride or chloroform when recovered from the reaction mixture.

The formation of this orange-red material is accelerated by increasing the area of contact between the aqueous layer and the chlorinated hydrocarbon layer. This may be done by stirring the reactants, or by adding the methylene chloride or chloroform to an aqueous solution of the other reactants. In any event, the formation of the orange-red material will occur at the interface of the chlorinated hydrocarbon and water; but, without some agitation of the reaction mixture, considerable time will usually be required for completion of the reaction. When using vigorous agitation, the reaction appears to go to substantial completion within a few minutes. Subsequent addition of the chlorinated hydrocarbon in conjunction with vigorous stirring will generally result in completion of the reaction practically simultaneously with the addition of the methylene chloride or chloroform.

The quantity of reactants used is not especially critical. Virtually any quantities or ratios of reactants will produce some of the orange-red material. Since the orange-red material is slightly soluble in water, the largest yields will be obtained when the amount of water is kept low. A large excess of water keeps all of the product in solution. I prefer to use an amount of water which will just dissolve the amount of hexamminecobalt(III) chloride which is added, since it is the least soluble of the two solid reactants.

Excess methylene chloride or chloroform can be added without any harmful effect. If too little is used, the yield of orange-red material will, of course, be reduced. Because of the nature of the complex of hexamminecobalt(III) benzylpenicillinate trihydrate and methylene chloride or chloroform, it is probable that at least two moles of chlorinated hydrocarbon should be added per mole of hexamminecobalt(III) chloride for stoichiometric proportions. In any event, the amount of chlorinated hydrocarbon to add can be gauged visually by observing at what point the orange-red material ceases to be formed.

The stoichiometric ratio of the solid reactants is 3 moles of the benzylpenicillinate to 1 mole of hexamminecobalt(III) chloride. Although this ratio is preferred, the process will be operative for greatly divergent ratios. As long as substantial quantities of both solid reactants are present, some product will be produced, if the appropriate amounts of the liquid reactants are present as previously discussed.

The reaction can be satisfactorily carried out at room temperature. Cooling the reaction mixture will tend to increase the yield of product by making the orange-red substance less soluble in the aqueous layer, and temperatures approaching 0° C. can be used if desired. The upper limit of temperature is governed by the stability of the benzylpenicillin salt. At temperatures above 30° C., some loss of benzylpenicillin salt may occur due to decomposition. There is no reason, however, for conducting the reaction at elevated temperatures.

Generally, all of the orange-red material will originally be formed as an oil, which is intermediate in density between the aqueous and chlorinated hydrocarbon layer. This oil can be crystallized by rubbing and stirring without separating it from the reaction mixture. Crystallization of the oil will be accelerated by adding a few seed crystals of hexamminecobalt(III) benzylpenicillinate. If desired, however, the oil can easily be separated from the other substances in the reaction vessel, since it exists as a separate layer. The usual methods of decanting or using a separatory funnel are, of course, applicable. After separation, the oil can be crystallized by procedures such as stirring, rubbing, and seeding. I prefer, however, to pour the separated oil into acetone, which effects a rapid and complete crystallization. Once in crystalline form, the material can be separated by filtration.

The product thus obtained is an orange colored crystalline solid, as distinguished from the oil, which, as previously stated, is orange-red. This product is, in general, relatively pure. If further purification is desired, however, washings with water, acetone and hexane can be used. Also, the oil layer can be washed with water after separation, but before crystallization.

The crystalline materials as formed either in situ or after separation will contain some of either the methylene chloride or chloroform whichever was used in the reaction. I have already stated that it is my belief that these chlorinated hydrocarbons are molecularly combined with hexamminecobalt(III) benzylpenicillinate as complexes; upon the separation of the crystals, however, these complexes begin to decompose. Generally, substantially all of the chlorinated hydrocarbon will evaporate on exposure of the crystals to air for a few hours, leaving hexamminecobalt(III) benzylpenicillinate trihydrate. The completion of the removal of the chlorinated hydrocarbon can be easily determined by an analysis of the material for chlorine. I have also found that the crystalline material can be dissolved in 1-butanol. Azeotropic distillation of this butanol solution under vacuum will remove the water and part of the butanol, causing the orange-red material to crystallize out, and effecting a further purification.

The hexamminecobalt(III) chloride which I use in my process can be prepared by any suitable means. I prefer, however, to use the method of Bjerrum and Reynolds (Inorganic Syntheses, McGraw-Hill, 1946, vol. II, pps. 217-218). The structure and method of preparation of the alkali and alkaline earth metal benzylpenicillinates are well known in the art. (See U. S. Patent No. 2,461,949.) Benzylpenicillin is also known as penicillin G.

The following specific examples will further illustrate my invention. It is to be understood that I do not limit my invention by these examples, but only by limitations appearing elsewhere in the specification and claims. Further modifications of the operational steps disclosed in these examples will be readily apparent to those skilled in the art.

EXAMPLE I

A solution containing 1.34 gm. of hexamminecobalt(III) chloride and 5.59 gm. of potassium benzylpenicillinate in 25 ml. of water was prepared. One hundred ml. of chloroform was then added to the solution with continual stirring. An orange-red oil separated almost immediately. Upon continued stirring and scratching with a glass rod the oil crystallized to orange platelets. The crystals were recovered by filtration and washed with three 25 ml. portions of water. The material was then exposed to air for about twelve hours. A yield of 4.6 gm. of hexamminecobalt(III) benzylpenicillinate trihydrate was obtained.

EXAMPLE II

A solution containing 0.7 gm. of hexamminecobalt(III) chloride in 15 ml. of water was prepared, and a solution of 3 gm. of potassium benzylpenicillinate in 5 ml. of water was added. This mixture was allowed to stand for 12 hours under refrigeration. No formation of the desired orange-red material occurred. On the addition of a little chloroform, however, the orange-red material began to form. Following the method of Example I, 1.0 gm. of hexamminecobalt(III) benzylpenicillinate trihydrate was obtained.

EXAMPLE III

Hexamminecobalt(III) chloride (1.4 gm.) and potassium benzylpenicillinate (6.0 gm.) were shaken in a separatory funnel with 25 ml. of water until completely dissolved. Fifty ml. of chloroform were then added, and the entire mixture was vigorously shaken. An orange-red oily layer, intermediate in density between the aqueous and chloroform layers was formed. This oil layer was poured slowly with vigorous stirring into 200 ml. of acetone. A voluminous finely-divided precipitate was formed almost immediately. This precipitate was recovered by filtration, washed with acetone and hexane, and air-dried. The yield of hexamminecobalt(III) benzylpenicillinate was 4.15 gm.

EXAMPLE IV

A solution containing 1.45 gm. of hexamminecobalt(III) chloride and 6.0 gm. of sodium benzylpenicillinate in 25 ml. of water was prepared and stirred with 100 ml. of chloroform. The oil layer formed, and was crystallized in situ by scratching and seeding. Crystallization was completed within 90 minutes. The crystals were recovered, washed, and air-dried. The product consisted of 3.5 gm. of hexamminecobalt(III) benzylpenicillinate trihydrate.

EXAMPLE V

By means of the method of Example I, hexamminecobalt(III) benzylpenicillinate trihydrate was prepared by substituting calcium benzylpenicillinate for the sodium benzylpenicillinate. The orange-red oil formed immediately on the addition of the chloroform and crystallized within 30 minutes.

EXAMPLE VI

Following the method of Example I, 1.4 gm. of hexamminecobalt(III) chloride and 6.0 gm. of potassium benzylpenicillinate were dissolved in 25 ml. of water. To this solution was added 100 ml. of methylene chloride instead of the chloroform. A yield of 3.5 gm. of hexamminecobalt(III) benzylpenicillinate trihydrate was obtained.

EXAMPLE VII

The combined product of several runs, constituting 7.7 gm. of hexamminecobalt(III) benzylpenicillinate trihydrate was dissolved in 100 ml. of 90% 1-butanol. This solution was azeotropically distilled under a vacuum to remove the water. As the butanol approached dryness, crystallization occurred. The precipitate was recovered by filtration, washed with 10 ml. of butanol and a quantity of acetone, and air-dried. The product weighed 5.1 gm. This material was then dried under a vacuum to a constant weight and its elementary composition was determined by standard analytical procedures. There was not found to be even a trace of chlorine present.

Analysis

Calculated for $C_{48}H_{75}O_{15}N_{12}S_3Co$: C, 47.45; H, 6.22; N, 13.84; S, 7.92; Co, 4.85.
Found: C, 47.47; H, 6.19; N, 13.84; S, 8.10; Co, 5.00.

EXAMPLE VIII

One gram of hexamminecobalt(III) benzylpenicillinate, obtained as described in Example VII, was dissolved in 20 ml. of water in a separatory funnel and 20 ml. of ethyl ether added. The mixture was then acidified dropwise with 1 N HCl, using agitation, until no more ether-soluble precipitate was formed momentarily in the aqueous layer. Three more drops of acid were then added, and the layers were separated.

The ether layer was dried for 10 minutes over 2 gm. of anhydrous sodium sulfate and then filtered. The sodium sulfate was washed with 80 ml. of diisopropyl ether, and the filtrate and washings combined. Almost immediate precipitation occurred; and, after 45 minutes in the refrigerator, the white crystals were filtered off and washed with diisopropyl ether. The dry product weighed 1.0 gm., assayed 1408 units/mg. and when analyzed by the N-ethyl-piperidine method showed 95.8% benzylpenicillinic acid. This product was identical with a sample of benzylpenicillinic acid diisopropyl etherate prepared by the method of Trenner and Buhs (J. Am. Chem. Soc., 70, 2897–2900).

The acidified aqueous layer at pH 2.1 was neutralized with dilute aqueous potassium hydroxide. An excess of potassium oxalate was then added, and precipitation occurred in about five minutes. The precipitate was filtered, washed with water, and dried. It was found to be identical with a known sample of hexamminecobalt(III) oxalate.

Hexamminecobalt(III) benzylpenicillinate trihydrate is an orange crystalline powder. The melting point of this compound is not sharp, but it begins to decompose at around 150° C. Its microbiological activity against Staphlococcus aureus by the standard cylinder-plate assay is about 1467 units/mg. It is quite stable in storage, and only moderately soluble in water.

Now having disclosed my invention, what I claim is:

1. Hexamminecobalt(III) benzylpenicillinate trihydrate.
2. In a process for the preparation of hexamminecobalt(III) benzylpenicillinate trihydrate, the step which consists of contacting a compound selected from the group consisting of methylene chloride and chloroform with an aqueous solution containing both hexamminecobalt(III) chloride and a compound selected from the group consisting of the alkali and alkaline earth metal salts of benzylpenicillin until an orange-red material is produced which decomposes on exposure to air to give hexamminecobalt(III) benzylpenicillinate trihydrate.
3. In a process for the preparation of hexamminecobalt(III) benzylpenicillinate trihydrate, the step which consists of producing contact between chloroform and an aqueous solution containing both hexamminecobalt(III) chloride and potassium benzylpenicillin until an orange-red oil is formed which decomposes on exposure to air to give hexamminecobalt(III) benzylpenicillinate trihydrate.
4. In a process for the preparation of hexamminecobalt(III) benzylpenicillinate trihydrate, the step which consists of producing contact between chloroform and an aqueous solution containing both hexamminecobalt(III) chloride and sodium benzylpenicillin until an orange-red oil is formed which decomposes on exposure to air to give hexamminecobalt(III) benzylpenicillinate trihydrate.
5. In a process for the preparation of hexamminecobalt(III) benzylpenicillinate trihydrate, the step which consists of producing contact between chloroform and an aqueous solution containing both hexamminecobalt(III) chloride and calcium benzylpenicillin until an orange-red oil is formed which decomposes on exposure to air to give hexamminecobalt(III) benzylpenicillinate trihydrate.
6. A process for the preparation of hexamminecobalt(III) benzylpenicillinate trihydrate which comprises forming an aqueous solution containing both hexamminecobalt(III) chloride and a compound selected from the group consisting of the alkali and alkaline earth metal salts of benzylpenicillin, contacting the said solution with a compound selected from the group consisting of methylene chloride and chloroform until an orange-red oil is produced, crystallizing this orange-red oil, recovering the crystalline material, and thereafter obtaining substantially pure hexamminecobalt(III) benzylpenicillinate trihydrate from the said crystalline material by exposing said material to air.
7. The process of claim 6 in which the said orange-red oil is crystallized in acetone.
8. The process of claim 6 in which hexamminecobalt(III) benzylpenicillinate trihydrate is subjected to further purification by dissolving the said hexamminecobalt(III) benzylpenicillinate in aqueous 1-butanol, distilling the said 1-butanol at a subatmospheric pressure until precipitation occurs, and separating the precipitate of purified hexamminecobalt(III) benzylpenicillinate trihydrate.
9. The process of claim 6 in which the said orange-red oil is crystallized in the reaction mixture.
10. The process of claim 6 in which the aqueous solution is substantially saturated with hexamminecobalt(III) chloride and about three moles of the selected benzylpenicillin compound are present per one mole of hexamminecobalt(III) chloride.
11. A process for the preparation of hexamminecobalt(III) benzylpenicillinate trihydrate which comprises forming an aqueous solution containing substantial quantities of both hexamminecobalt(III) chloride and potassium benzylpenicillin, contacting the said solution with chloroform until an orange-red oil is produced, crystallizing this orange-red oil, recovering the crystalline material and obtaining substantially pure hexamminecobalt(III) benzylpenicillinate trihydrate from the said crystalline material by exposing said material to air.

12. A process for the preparation of hexamminecobalt(III) benzylpenicillinate trihydrate which comprises forming an aqueous solution containing substantial quantities of both hexamminecobalt(III) chloride and sodium benzylpenicillin, contacting the said solution with chloroform until an orange-red oil is produced, crystallizing this orange-red oil, recovering the crystalline material and obtaining substantially pure hexamminecobalt(III) benzylpenicillinate trihydrate from the said crystalline material by exposing said material to air.

13. A process for the preparation of hexamminecobalt(III) benzylpenicillinate trihydrate which comprises forming an aqueous solution containing substantial quantities of both hexamminecobalt(III) chloride and calcium benzylpenicillin, contacting the said solution with chloroform until an orange-red oil is produced, crystallizing this orange-red oil, recovering the crystalline material and obtaining substantially pure hexamminecobalt(III) benzylpenicillinate trihydrate from the said crystalline material by exposing said material to air.

ROBERT W. SHORTRIDGE.

No references cited.